(12) United States Patent
Geniesse et al.

(10) Patent No.: US 10,059,600 B2
(45) Date of Patent: Aug. 28, 2018

(54) SODIUM CARBONATE MONOHYDRATE CRYSTALLIZATION

(71) Applicant: Swenson Technology, Inc., Monee, IL (US)

(72) Inventors: Donald James Geniesse, Richland, WA (US); Timothy Kenneth Nordahl, Glen Ellyn, IL (US); Kyle Brandon Hiatt, Merrilville, IN (US)

(73) Assignee: Swenson Technology, Inc., Monee, IL (US)

( * ) Notice: Subject to any disclaimer, the term of this patent is extended or adjusted under 35 U.S.C. 154(b) by 0 days.

(21) Appl. No.: 15/213,675

(22) Filed: Jul. 19, 2016

(65) Prior Publication Data

US 2017/0029283 A1 Feb. 2, 2017

Related U.S. Application Data

(60) Provisional application No. 62/199,967, filed on Jul. 31, 2015.

(51) Int. Cl.
*C01D 7/24* (2006.01)
*B01D 9/00* (2006.01)

(52) U.S. Cl.
CPC ............. *C01D 7/24* (2013.01); *B01D 9/0022* (2013.01); *B01D 9/0031* (2013.01)

(58) Field of Classification Search
CPC ....... C01D 7/24; B01D 9/0022; B01D 9/0031
See application file for complete search history.

(56) References Cited

U.S. PATENT DOCUMENTS

| | | | |
|---|---|---|---|
| 1,853,275 A | 4/1932 | Houghton et al. | |
| 1,911,794 A | 5/1933 | Britton | |
| 2,049,249 A | 7/1936 | Cunningham | |
| 2,133,455 A * | 10/1938 | Keene | C01D 7/38 422/288 |
| 2,193,817 A | 3/1940 | Houghton | |
| 2,267,136 A | 12/1941 | Robertson | |
| 2,346,140 A | 4/1944 | Pike | |
| 2,388,009 A | 10/1945 | Pike | |
| 2,625,384 A | 1/1953 | Pike et al. | |
| 2,639,217 A | 5/1953 | Pike | |
| 2,770,524 A | 11/1956 | Seaton et al. | |
| 2,780,520 A | 2/1957 | Pike et al. | |
| 2,792,282 A | 5/1957 | Pike et al. | |
| 2,798,790 A | 7/1957 | Pike et al. | |
| 2,887,360 A | 5/1959 | Hoekje | |
| 2,962,348 A | 11/1960 | Seglin et al. | |
| 2,970,037 A | 1/1961 | Caldwell et al. | |
| 3,028,215 A | 4/1962 | Frint | |
| 3,050,290 A | 8/1962 | Caldwell et al. | |
| 3,113,834 A | 12/1963 | Beecher et al. | |
| 3,119,655 A | 1/1964 | Frint et al. | |
| 3,131,996 A | 5/1964 | Seglin et al. | |
| 3,184,287 A | 5/1965 | Gancy | |
| 3,212,848 A | 10/1965 | Tasiaux | |
| 3,233,983 A | 2/1966 | Bauer et al. | |
| 3,244,476 A | 4/1966 | Smith | |
| 3,260,567 A | 7/1966 | Hellmers et al. | |
| 3,264,057 A | 8/1966 | Miller | |
| 3,273,958 A | 9/1966 | Peverley | |
| 3,273,959 A | 9/1966 | Miller | |
| 3,361,540 A | 1/1968 | Peverley et al. | |
| 3,395,906 A | 8/1968 | Wiseman et al. | |
| 3,425,795 A | 2/1969 | Howard et al. | |
| 3,451,767 A | 6/1969 | Saeman et al. | |
| 3,455,647 A | 7/1969 | Gloster | |
| 3,459,497 A | 8/1969 | Coglaiti, Jr. et al. | |
| 3,477,808 A | 11/1969 | Hellmers | |
| 3,479,133 A | 11/1969 | Warzel | |
| 3,486,844 A | 12/1969 | Tabler | |
| 3,498,744 A | 3/1970 | Frint et al. | |
| 3,528,766 A | 9/1970 | Coglaiti, Jr. et al. | |
| 3,634,999 A | 1/1972 | Howard et al. | |
| 3,655,331 A | 4/1972 | Seglin et al. | |
| 3,656,892 A | 4/1972 | Bourne et al. | |
| 3,705,790 A | 12/1972 | Garofano et al. | |
| 3,717,698 A | 2/1973 | Ilardi | |
| 3,725,014 A | 4/1973 | Poncha et al. | |
| 3,796,794 A | 3/1974 | Ilardi | |
| 3,819,805 A | 6/1974 | Graves et al. | |
| 3,836,628 A | 9/1974 | Ilardi et al. | |
| 3,838,189 A | 9/1974 | Sopchak et al. | |
| 3,845,119 A | 10/1974 | Duke et al. | |
| 3,869,538 A | 3/1975 | Sproul et al. | |
| 3,870,780 A | 3/1975 | Guptill | |
| 3,904,733 A | 9/1975 | Gancy et al. | |
| 3,933,977 A | 1/1976 | Ilardi et al. | |
| 3,953,073 A | 4/1976 | Kube | |
| 3,956,457 A | 5/1976 | Port et al. | |
| 3,991,160 A | 11/1976 | Gancy et al. | |
| 4,019,872 A | 4/1977 | Walden | |
| 4,021,525 A | 5/1977 | Poncha | |
| 4,021,526 A | 5/1977 | Gancy et al. | |
| 4,021,527 A | 5/1977 | Baadsgaard | |
| 4,022,867 A | 5/1977 | Gancy et al. | |
| 4,022,868 A | 5/1977 | Poncha | |
| 4,039,617 A | 8/1977 | Kuo | |
| 4,039,618 A | 8/1977 | Gancy et al. | |
| 4,044,097 A | 8/1977 | Gancy et al. | |
| 4,083,939 A | 4/1978 | Lobunez et al. | |
| 4,116,757 A | 9/1978 | Garofano et al. | |
| 4,151,261 A | 4/1979 | Poncha et al. | |
| 4,160,812 A | 7/1979 | Conroy et al. | |
| 4,183,901 A | 1/1980 | Ilardi et al. | |
| 4,202,667 A | 5/1980 | Conroy et al. | |
| 4,286,967 A | 9/1981 | Booth, Jr. et al. | |
| 4,288,419 A | 9/1981 | Copenhafer et al. | |
| 4,291,002 A | 9/1981 | Arnold et al. | |
| 4,299,799 A | 11/1981 | Ilardi et al. | |
| 4,341,744 A | 7/1982 | Brison et al. | |

(Continued)

*Primary Examiner* — Daniel C McCracken
(74) *Attorney, Agent, or Firm* — Morgan, Lewis & Bockius LLP

(57) ABSTRACT

A process for preparing solid sodium carbonate monohydrate from a solution of sodium carbonate is described.

10 Claims, 6 Drawing Sheets

(56) References Cited

U.S. PATENT DOCUMENTS

| | | |
|---|---|---|
| 4,344,650 A | 8/1982 | Pinsky et al. |
| 4,374,102 A | 2/1983 | Connelly et al. |
| 4,375,454 A | 3/1983 | Imperto |
| 4,401,635 A | 8/1983 | Frint |
| 4,472,280 A | 9/1984 | Keeney |
| 4,498,706 A | 2/1985 | Ilardi et al. |
| 4,519,806 A | 5/1985 | Copenhafer et al. |
| 4,738,836 A | 4/1988 | Poncha et al. |
| 4,781,899 A | 11/1988 | Rauh et al. |
| 4,814,151 A | 3/1989 | Benke |
| 4,869,882 A | 9/1989 | Dome et al. |
| 5,043,149 A | 8/1991 | Frint et al. |
| 5,192,164 A | 3/1993 | Frint et al. |
| 5,205,493 A | 4/1993 | Adler et al. |
| 5,238,664 A | 8/1993 | Frint et al. |
| 5,262,134 A | 11/1993 | Frint et al. |
| 5,283,054 A | 2/1994 | Copenhafer et al. |
| 5,575,922 A | 11/1996 | Green et al. |
| 5,609,838 A | 3/1997 | Neuman et al. |
| 5,618,504 A | 4/1997 | Delling et al. |
| 5,624,647 A | 4/1997 | Zolotoochin et al. |
| 5,759,507 A | 6/1998 | Delling et al. |
| 5,766,270 A | 6/1998 | Neuman et al. |
| 5,783,159 A | 7/1998 | Aldinger |
| 5,911,959 A | 6/1999 | Wold et al. |
| 5,955,043 A | 9/1999 | Neuman et al. |
| 5,989,505 A | 11/1999 | Zolotoochin et al. |
| 6,022,516 A | 2/2000 | Copenhafer et al. |
| 6,207,123 B1 | 3/2001 | Tanaka et al. |
| 6,228,335 B1 | 5/2001 | Copenhafer et al. |
| 6,251,346 B1 | 6/2001 | Neuman et al. |
| 6,284,005 B1 | 9/2001 | Hazen et al. |
| 6,322,767 B1 | 11/2001 | Neuman et al. |
| 6,428,759 B1 | 8/2002 | Smith et al. |
| 6,576,206 B2 | 6/2003 | Copenhafer et al. |
| 6,589,497 B2 | 7/2003 | Smith |
| 6,609,761 B1 | 8/2003 | Ramey et al. |
| 6,667,021 B2 | 12/2003 | Braman et al. |
| 7,018,594 B2 | 3/2006 | Copenhafer |
| 7,128,886 B2 | 10/2006 | Ramey et al. |
| 7,255,841 B2 | 8/2007 | Kurtz |
| 7,410,627 B2 | 8/2008 | Ramey et al. |
| 7,507,388 B2 | 3/2009 | Ceylan et al. |
| 7,611,208 B2 | 11/2009 | Day et al. |
| 7,638,109 B2 | 12/2009 | Copenhafer |
| 7,645,435 B2 | 1/2010 | Braman et al. |
| 8,057,765 B2 | 11/2011 | Day et al. |
| 8,454,840 B1 | 6/2013 | Copenhafer |
| 8,603,192 B2 | 12/2013 | Rittof et al. |
| 8,678,513 B2 | 3/2014 | Hughes et al. |
| 8,771,622 B2 | 7/2014 | Hughes et al. |
| 8,858,902 B2 | 10/2014 | Copenhafer |
| 8,899,691 B2 | 12/2014 | Day et al. |

* cited by examiner

SODIUM CARBONATE MONOHYDRATE CRYSTALLIZATION

BACKGROUND OF THE INVENTION

Conventional techniques for carrying out industrial-scale crystallization of sodium carbonate monohydrate involve evaporative crystallization and the unaltered boiling temperature of a solution of sodium carbonate at the barometric pressure of the plant location, which is dependent on the geographic elevation of the plant.

However, conventional techniques suffer from problems such as poor crystal quality due to impurities present in the feed liquor. As an example, sodium chloride lowers the transition temperature of sodium carbonate monohydrate to anhydrous sodium carbonate. Crystallization of anhydrous sodium carbonate is undesirable because of the negative slope of its temperature-solubility curve, which results in rapid fouling of heat transfer equipment and frequent shutdowns to clean anhydrous sodium carbonate from surfaces of the heat transfer equipment. As such, there is an ongoing need for improving this step to avoid or diminish the aforementioned problems, especially in view of the large scale (e.g., about 100 metric tons (MT) per hour) under which the step is typically carried out.

The present invention addresses the shortcomings associated with conventional technologies by implementing changes in the operating conditions of the sodium carbonate monohydrate crystallizers to substantially reduce or eliminate the potential for precipitation of anhydrous sodium carbonate on heat transfer surfaces. Typically, these changes result in the lowering of the operating pressures and boiling temperatures of the sodium carbonate monohydrate crystallizers to significantly improve plant onstream time and overall plant yield. By employing these changes, it was unexpectedly observed that higher concentrations of impurities, such as sodium chloride, may be tolerated without causing the undesirable transition of sodium carbonate monohydrate to anhydrous sodium carbonate. This methodology also allows for higher impurity concentrations during the crystallization step, thereby desirably minimizing the impurity purge stream volume.

Soda ash (sodium carbonate ($Na_2CO_3$)) is presently produced on a commercial scale by three industrial processes: the trona ore process (which uses natural soda ash); the Solvay process (which uses sodium chloride and limestone); and the Hou process (which uses sodium chloride, ammonia, and limestone). Each of these three process routes employs different methods for producing an aqueous solution of sodium carbonate. The Solvay and Hou processes produce sodium bicarbonate ($NaHCO_3$) by reaction of carbon dioxide ($CO_2$) with an ammoniated brine solution.

$$NH_3 + NaCl + CO_2 + H_2O \rightarrow NaHCO_3 + NH_4Cl$$

The sodium bicarbonate is then calcined to produce soda ash.

$$2NaHCO_{3(s)} \rightarrow Na_2CO_{3(s)} + H_2O + CO_2$$

The Solvay process produces a calcium carbonate ($CaCO_3$) waste stream. The Hou process produces ammonium chloride ($NH_4Cl$) as a by-product.

In the trona ore process shown below, mined trona ore (sodium sesquicarbonate ($2NaHCO_3 \cdot Na_2CO_3 \cdot 2H_2O$)) is calcined to crude soda ash, which is then dissolved in water to remove insoluble minerals. Sodium carbonate monohydrate is then crystallized by evaporative crystallization. The isolated crystalline sodium carbonate monohydrate is then dried by air heating to produce anhydrous soda ash.

$$2NaHCO_3 \cdot Na_2CO_3 \cdot 2H_2O_{(s)} \rightarrow 3Na_2CO_3 + CO_2 + 5H_2O$$

$$Na_2CO_3 + H_2O \rightarrow Na_2CO_3 \cdot H_2O_{(s)}$$

$$Na_2CO_3 \cdot H_2O_{(s)} \rightarrow Na_2CO_{3(s)} + H_2O$$

The trona ore process is the preferred process route to produce soda ash due to its lower raw material and energy costs relative to the Solvay and Hou processes. The trona ore process also produces less waste and byproducts than the other processes.

In addition to the trona ore mining process, soda ash is extracted from trona ore by solution mining. In solution mining, water is injected into the trona ore strata, and sodium carbonate and bicarbonate salts are dissolved into the brine solution. The brine solution is recovered from the trona strata and processed to recover soda ash values. Dissolved sodium bicarbonate in the brine is converted to sodium carbonate by steam stripping carbon dioxide gas. Similar to the trona ore process, sodium carbonate monohydrate is crystallized from the stripped solution by evaporative crystallization, and the resulting crystalline sodium carbonate monohydrate is air dried to produce anhydrous soda ash.

$$NaHCO_3 \cdot Na_2CO_3 \cdot 2H_2O_{(s)} \rightarrow NaHCO_3 + Na_2CO_3 + 2H_2O$$

$$2NaHCO_3 \rightarrow Na_2CO_3 + CO_2 + H_2O$$

$$Na_2CO_3 + H_2O \rightarrow Na_2CO_3 \cdot H_2O_{(s)}$$

$$Na_2CO_3 \cdot H_2O_{(s)} \rightarrow Na_2CO_{3(s)} + H_2O$$

Solution mining offers lower raw material costs than trona ore mining by the avoidance of subsurface ore mining operations. However, solution mining is notably nonselective to soda ash minerals. As a result, any soluble salts such as, but not limited to, salts such as sodium chloride and sulfate that are present in the trona ore strata are co-dissolved into the solution mining brine. In the same manner as sodium sesquicarbonate, sodium chloride and sulfate can dissolve to their solubility limits in the brine. Consequently, the concentrations of these impurities fed to the soda ash plant from solution mining can be significantly higher than from the trona ore mining process, and the potential to undesirably form anhydrous sodium carbonate during the crystallization processes is correspondingly higher.

In an effort to overcome the higher impurity concentrations present in solution mining operations, the inventors made improvements in the design and operation of soda ash crystallization systems that were observed to result in the prevention of the undesirable anhydrous sodium carbonate fouling, to improve yield, and to reduce the volume of the purge stream. Additional and unexpected benefits included the increased production of the crystalline monohydrate product and a significant reduction in power consumption during the crystallization process.

BRIEF DESCRIPTION OF THE DRAWINGS

The figures provided herein merely represent typical examples of the present invention and are not intended to otherwise limit the scope of the invention as described herein.

SUMMARY OF THE INVENTION

Figure 1:
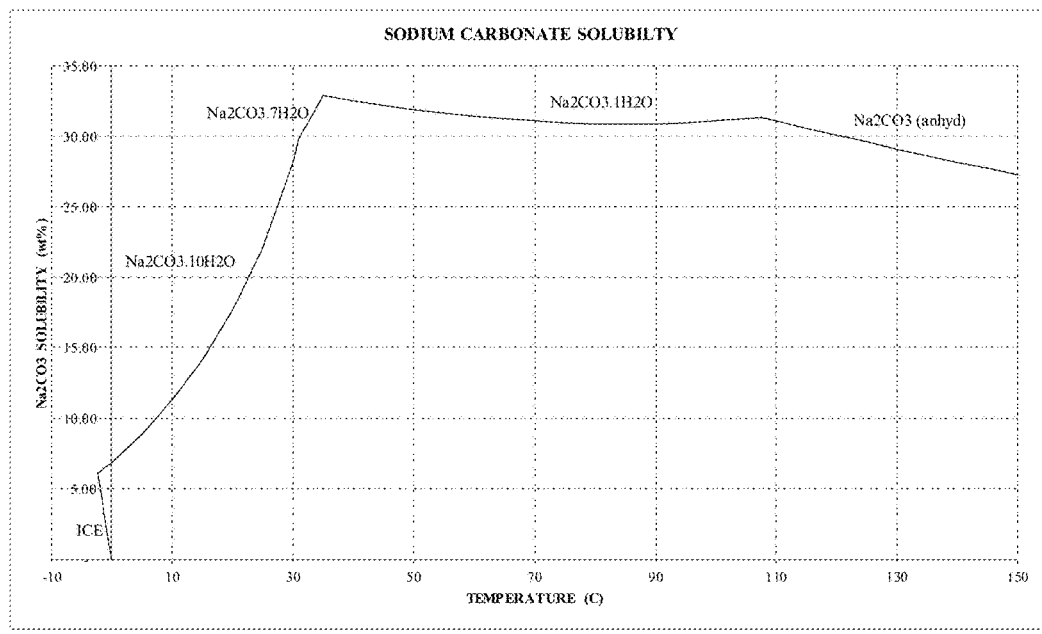
FIG. 1 depicts a phase diagram of a pure sodium carbonate-water system. In this system, the transition temperature of sodium carbonate monohydrate to anhydrous sodium carbonate occurs at approximately 107° C. and at a concentration of 31.4 wt percent $Na_2CO_3$.
Figure 2:
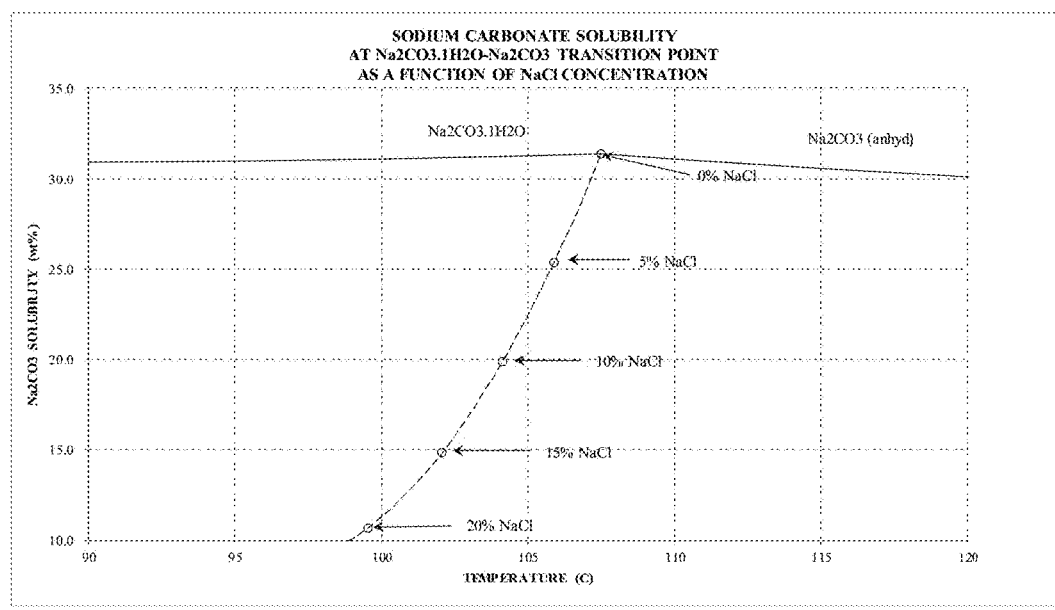
FIG. 2 depicts the effect of increasing sodium chloride concentration on the transition temperature of sodium carbonate monohydrate to anhydrous sodium carbonate. At a concentration of 5% NaCl, the transition temperature decreases to 106° C. At 10% NaCl, the transition temperature decreases to 104° C. At 15% NaCl, the transition temperature decreases to 102° C., and at 20% NaCl, the transition temperature decreases to 99° C.

In order to compensate for the lowering of the sodium carbonate monohydrate-sodium carbonate anhydrous phase transition temperature with increasing sodium chloride concentration, the present invention has modified the design and operation of sodium carbonate evaporative crystallizers to operate at sub-atmospheric pressure. By employment of this method, the boiling temperature of the crystallizer solution is lowered to less than its atmospheric boiling point, and higher concentrations of sodium chloride may be tolerated without the undesirable transition to anhydrous sodium carbonate. In addition, soda ash yield is increased by allowing higher impurity concentrations during crystallization and increased onstream time between cleanings.

An aspect of the present invention is a process for crystallizing sodium carbonate monohydrate in high concentration sodium chloride solutions, which includes the following steps: 1) modifying existing industrial monohydrate crystallization equipment to operate at sub-atmospheric pressures by, for example, but not limited to, adapting the equipment for operation at a lower vapor density and at a higher velocity in the vapor body of the crystallizer; 2) adapting vapor/liquid disengagement equipment for operation at higher vapor velocities to prevent droplet impingement on mechanical vapor recompression (MVR) turbine blades; and 3) adapting MVR equipment to operate at lower suction and discharge pressures.

Another aspect of the present invention is to adapt existing chemical plants to operate with higher amounts of sodium carbonate decahydrate solid crystal. The decahydrate recycle increases the amount of evaporation required in order to obtain a maximum total product yield.

An aspect of the present invention is a method for preparing solid sodium carbonate monohydrate ($Na_2CO_3.1H_2O$) from a solution comprising or consisting of sodium carbonate and sodium chloride in an aqueous media, the method comprising or consisting of reducing the pressure of a vessel containing the solution such that the boiling point of the solution decreases below the $Na_2CO_3.1H_2O$ to anhydrous $Na_2CO_3$ transition temperature.

An aspect of the present invention is a method for preparing solid sodium carbonate monohydrate ($Na_2CO_3.1H_2O$) from a solution comprising or consisting of sodium carbonate, sodium chloride, and sodium sulfate in an aqueous media, the method comprising or consisting of reducing the pressure of a vessel containing the solution such that the boiling point of the solution decreases below the $Na_2CO_3.1H_2O$ to anhydrous $Na_2CO_3$ transition temperature.

In an aspect of the invention, the aqueous media is water.

In an aspect of the invention, the sodium chloride is present in an amount greater than 0 but less than 32 wt percent, such as, for example, greater than 0 but less than 30 wt percent, such as, for example, greater than 0 but less than 28 wt percent, such as, for example, greater than 0 but less than 26 wt percent, such as, for example, greater than 0 but less than 24 wt percent, such as, for example, greater than 0 but less than 22 wt percent, such as, for example, greater than 0 but less than 20 wt percent, such as, for example, greater than 0 but less than 18 wt percent, such as, for example, greater than 0 but less than 16 wt percent, such as, for example, greater than 0 but less than 14 wt percent, such as, for example, greater than 0 but less than 12 wt percent, such as, for example, greater than 0 but less than 10 wt percent, such as, for example, greater than 0 but less than 8 wt percent, such as, for example, greater than 0 but less than 6 wt percent, such as, for example, greater than 0 but less than 4 wt percent, such as, for example, greater than 0 but less than 2 wt percent.

In an aspect of the invention, the sodium chloride is present in an amount between 3 wt percent and 5 wt percent.

In an aspect of the invention, the sodium chloride is present in an amount between 5 wt percent and 10 wt percent.

In an aspect of the invention, the sodium sulfate concentration is present in an amount between 0 and 4 wt percent.

In an aspect of the invention, the solid sodium carbonate monohydrate is in a crystalline form, such as an orthorhombic crystalline form.

In an aspect of the invention, the vessel containing the solution comprising sodium carbonate and sodium chloride in an aqueous media may be any of mechanical vapor recompression (MVR) or multiple effect evaporation crystallizers.

In an aspect of the invention, the pressure levels inside the vessel may vary between 0.10 and 0.99 atmospheres, such as between 0.10 and 0.90 atmospheres, such as between 0.10 and 0.80 atmospheres, such as between 0.10 and 0.70 atmospheres, such as between 0.10 and 0.60 atmospheres, such as between 0.10 and 0.50 atmospheres, such as between 0.10 and 0.40 atmospheres, such as between 0.10 and 0.30 atmospheres.

In an aspect of the invention, the temperature levels inside the vessel may vary between 50 and 110° C., such as between 50 and 105° C., such as between 50 and 100° C., such as 50 and 95° C., such as between 50 and 90° C., such as between 50 and 85° C., such as between 50 and 80° C.

In an aspect of the invention, the pressure of a vessel containing the solution in a multiple effect design is reduced by any of several methods, such as by changing the operating condition of a final surface or barometric condenser by using colder water in the condenser, or boosting the final stage pressure by using, for example, a steam ejector thermocompressor to raise the vapor flow pressure from a new lower pressure value up to the original design conditions. For a mechanical vapor recompression design, the vapor compressor wheel size can be increased to move a greater volumetric vapor flow at a lower pressure, or an existing mechanical vapor compressor can be supplemented by adding a lower pressure fan system to compress lower pressure water vapor up to the inlet condition of the existing compressor. In the multiple effect example, vacuum pump control can be achieved by existing methods of vapor pre-condensers, steam booster ejectors, and modification of the process non-condensable gas venting arrangements to reduce the water condensing loads on the final condensing system. The same strategies can be applied to a mechanical vapor recompression application.

In an aspect of the invention, the amount of solid sodium carbonate monohydrate prepared by this process ranges from historical minimums of as little as 100 MT/day, up to 3,000 MT/day for a single production line, and applied to plants operating more than one crystallizer system with combined operating rates of 10,000 MT/day.

DETAILED DESCRIPTION

Definitions

As described herein, the phrase "$Na_2CO_3.1H_2O$ to anhydrous $Na_2CO_3$ transition temperature" is intended to describe the sodium carbonate slurry temperature where the solid phase loses its water of hydration.

As described herein, the name "sodium carbonate monohydrate" is equivalent to $Na_2CO_3.1H_2O$.

As described herein, the term "monohydrate" refers to sodium carbonate monohydrate.

Sodium carbonate monohydrate is a preferred crystal for preparation by industrial crystallization because the solubility-temperature slope is relatively flat and the $Na_2CO_3.1H_2O$ crystals have regular orthorhombic morphology which results in superior crystal growth and solid/liquid separation.

In contrast, crystallization of anhydrous soda ash is undesirable because of the negative slope of the temperature-solubility curve and the irregular morphology of the crystal. These properties result in fouling of equipment and poor solid-liquid separation. In addition, anhydrous sodium carbonate is unstable: cooling of the crystallizer slurry may cause hydration of $Na_2CO_3$ to $Na_2CO_3.1H_2O$ or other hydrates resulting in a loss of water from the solution and the potential for solidification of the contents of the crystallizer system.

In a pure $H_2O$—$Na_2CO_3$ system, the transition of $Na_2CO_3.1H_2O$ to anhydrous $Na_2CO_3$ occurs at a temperature of approximately 107.8° C. and at a pressure of approximately 1.11 atm. Thus, in a pure $H_2O$—$Na_2CO_3$ system, the transition to anhydrous sodium carbonate will not occur when boiling at standard atmospheric pressure (1.0 atm). However, the transition temperature is lowered by the presence of impurities.

Soda ash plants must deal with such impurities (e.g., sodium chloride (NaCl)), which have been steadily increasing over time from trona ore and solution mining brines and from the recycling of solar pond brine resulting from lower quality feedstocks. This increase in sodium chloride concentrations results in reduced soda ash yield and increased operational problems.

Thus, in the presence of NaCl contamination, it is desirable to reduce the boiling temperature by reducing the operating pressure of the system to minimize or prevent the transition of $Na_2CO_3.1H_2O$ to anhydrous $Na_2CO_3$.

Figure 5:
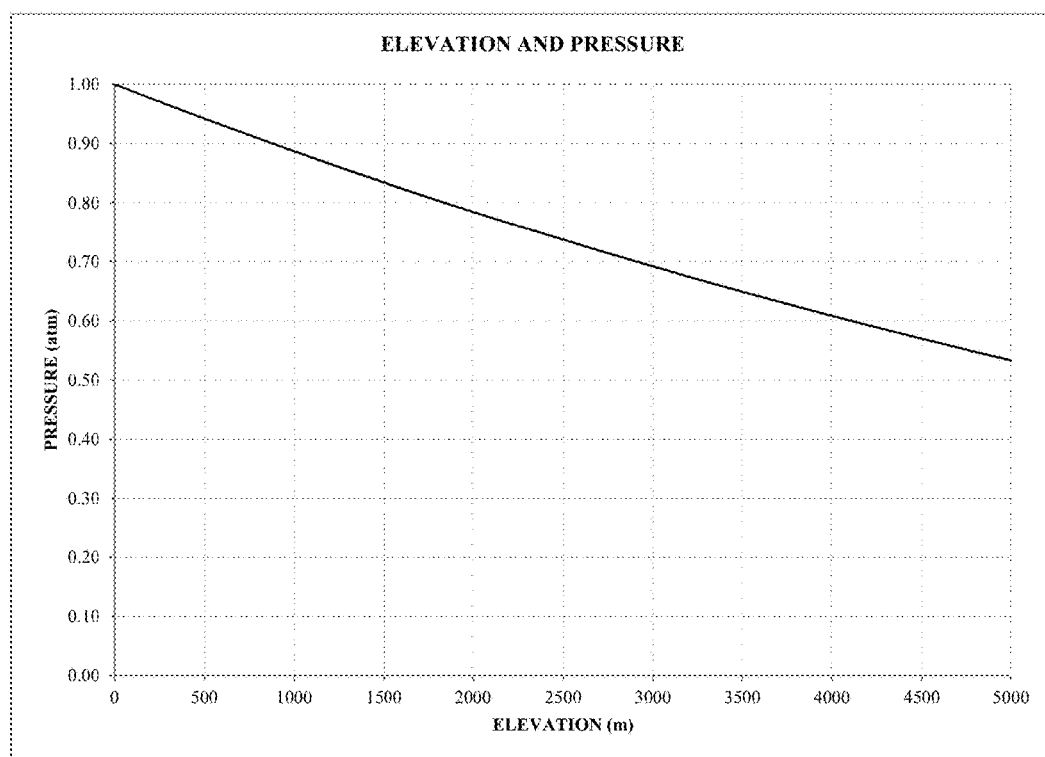
FIG. 5 depicts the effect of elevation on barometric pressure. For example, barometric pressure decreases from 1.0 atm at sea level to 0.53 atm at an elevation of 5000 meters. This effect exerts a significant influence on the boiling point temperatures of solutions at differing altitudes.

Commercial sodium carbonate monohydrate crystallizers currently operate at the barometric pressure of each plant location, with the barometric pressure varying with altitude as shown in FIG. 5. For example, a plant located in Green River, Wyo. at an elevation of 1,920 meters has a barometric pressure of 0.79 atm. A plant in Beypazari, Turkey at an elevation of 840 meters has a barometric pressure of 0.90 atm.

Figure 3:
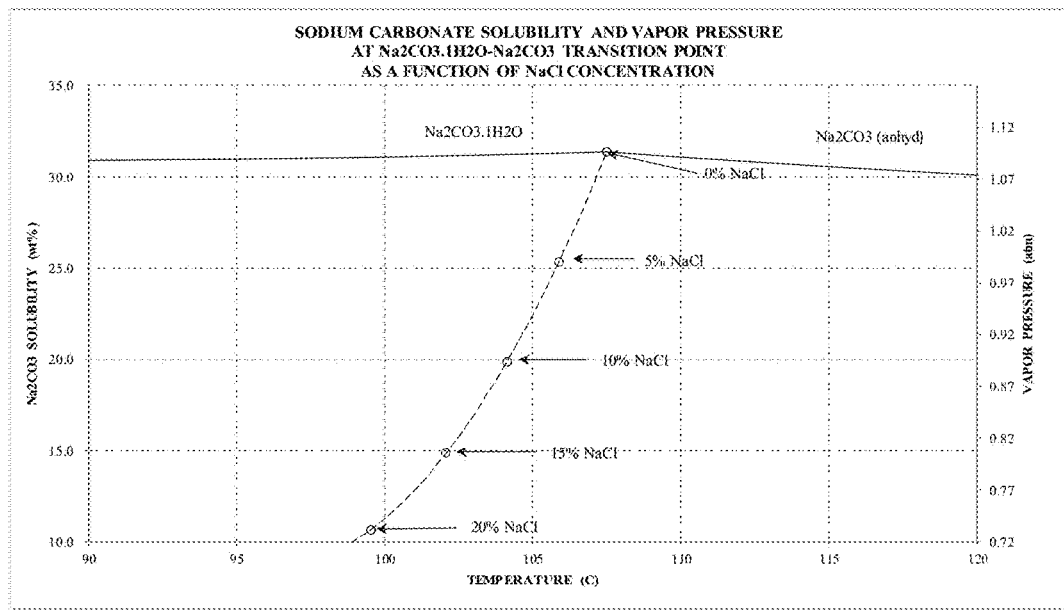
FIG. 3 depicts the effect of increasing sodium chloride concentration on the vapor pressure of a sodium carbonate-water system at the sodium carbonate monohydrate to anhydrous sodium carbonate transition temperature. At a concentration of 5% NaCl, the vapor pressure is 1.01 atmospheres (atm) at the transition temperature. At 10% NaCl the vapor pressure is 0.93 atm. At 15% NaCl, the vapor pressure is 0.84 atm, and at 20% NaCl the vapor pressure is 0.73 atm.

Based on these pressures, the maximum sodium chloride concentration in the monohydrate crystallizers at these locations can be estimated using FIG. 3. For example, the maximum sodium chloride content for a monohydrate crystallizer operating at ambient pressure in Green River, Wyo. (0.79 atm) is 16.7% at a boiling temperature of approximately 100.9° C. By comparison, for a plant operating at ambient pressure in Beypazari, Turkey (0.90 atm), the maximum sodium chloride concentration is 11.2% at a boiling temperature of approximately 103.5° C.

The maximum NaCl concentration in a sodium carbonate monohydrate system is 22.9%. At this concentration, the transition of $Na_2CO_3.1H_2O$ to anhydrous $Na_2CO_3$ occurs at a temperature of 98.6° C. and at a pressure of 0.69 atmospheres. At higher NaCl concentrations, anhydrous $Na_2CO_3$ and NaCl co-crystallize.

Based on the above observations, it was determined to be desirable to operate sodium carbonate monohydrate crystallizers at reduced pressures and temperatures to allow for higher concentrations of sodium chloride without the transition of sodium carbonate monohydrate to anhydrous sodium carbonate. From the above data, an operating pressure of 0.69 atmospheres allowed sodium chloride concentrations of up to 22.9% while crystallizing sodium carbonate monohydrate. Operation under these conditions unexpectedly allowed for the highest crystallization yield of soda ash while minimizing the volume of the crystallizer purge stream.

Figure 4:
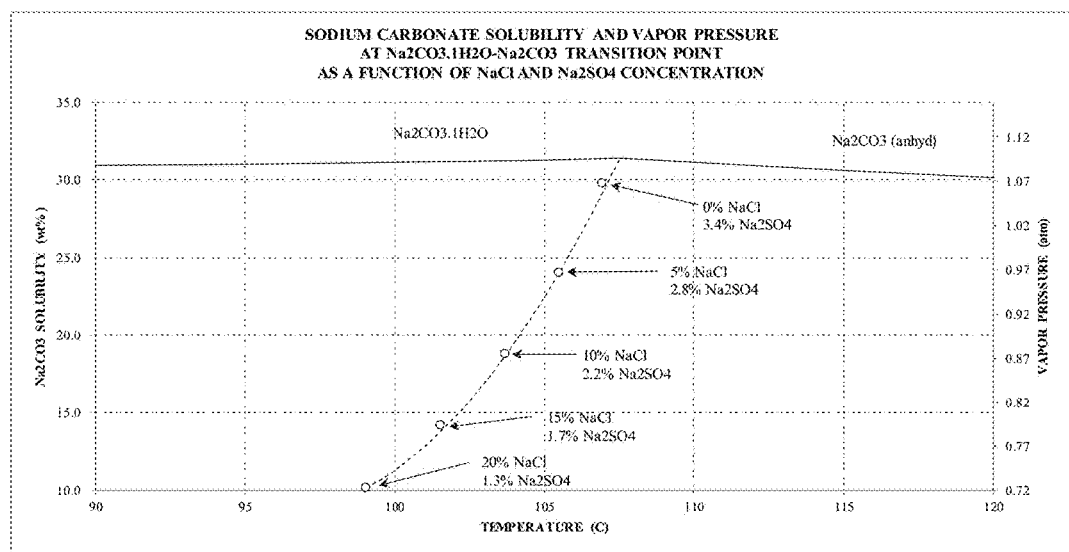
FIG. 4 depicts the maximum sodium sulfate concentration in a saturated sodium chloride and sodium carbonate-water system at the sodium carbonate monohydrate to anhydrous sodium carbonate transition temperature. For example, at a concentration of 0% NaCl, the maximum sodium sulfate concentration is 3.4% at a transition temperature of 107° C. and at a vapor pressure of 1.07 atm. At 20% NaCl, maximum sodium sulfate concentration is 1.3% at a transition temperature of 99° C. and a vapor pressure of 0.72 atm.

In addition, operating sodium carbonate monohydrate crystallizers at reduced pressures and temperatures allows for higher concentrations of other impurities, such as sodium sulfate. As indicated in FIG. 4, operating at a pressure of 0.72 atmospheres and at a temperature of 99° C. permits concentrations of 1.3% sodium sulfate and 20% sodium chloride before the transition of sodium carbonate monohydrate to anhydrous sodium carbonate occurs.

EXAMPLES

Example 1 (Conventional and Comparative)

One thousand forty three (1,043) grams of deionized water and 253.4 grams sodium carbonate and 168.5 grams sodium chloride were placed in a 2-liter, baffled, round bottom glass flask. Agitation was started using a bladed stirrer rotating at 1455 rpm. After 475 grams of water were evaporated at a barometric pressure of 751 mm Hg (0.99 atm) and at a temperature of 108° C. over a period of 4 hours, the entire flask contents were emptied into a Büchner funnel and the crystal product was separated from the mother liquor by vacuum filtration. The filter cake had a mass of 175.6 grams and the filtrate weighed 822.5 grams. After drying at 100° C., the filter cake had a mass of 134.9 grams. Microscopic examination of the crystalline product revealed that amorphous anhydrous sodium carbonate was formed. The overall sodium carbonate yield was 67.6% of theoretical.

Example 2

Figure 6:
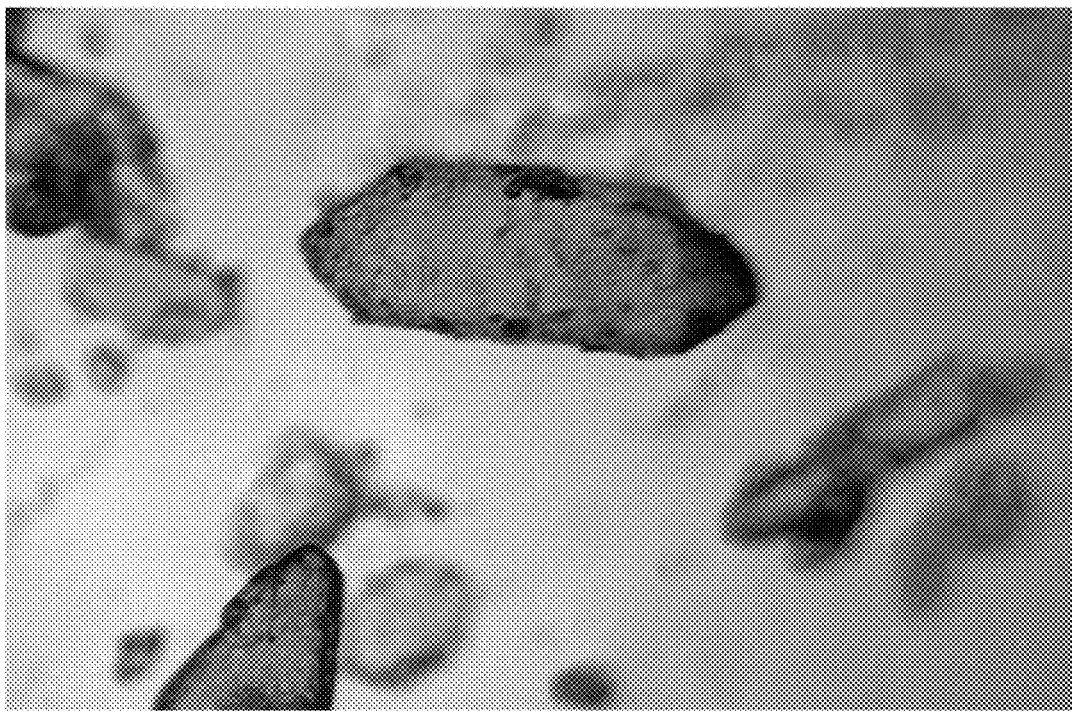
FIG. 6 is a micrograph of sodium carbonate monohydrate crystals prepared as described in Example 2.

The same procedure was carried out as in Example 1 except for the operating pressure and temperature. The 475 grams of water were evaporated at an absolute pressure of 517 mm Hg (0.68 atm) and at a temperature of 96° C. The filter cake had a mass of 182.6 grams and the filtrate weighed 806.8 grams. After drying at 100° C., the filter cake had a mass of 141.6 grams. Microscopic examination of the crystalline product revealed that orthorhombic sodium carbonate monohydrate was formed. A micrograph of a sample of the product is shown in FIG. 6.

Example 2 is evidence that high purity sodium carbonate monohydrate may be formed from a solution containing significantly high concentrations of sodium chloride. The final liquor contained approximately 11.5 wt % sodium carbonate and 20.3 wt % sodium chloride. The overall sodium carbonate yield was 79.4% of theoretical yield.

All publications cited herein are incorporated by reference in their entireties.

REFERENCES

U.S. Pat. Nos. 1,853,275; 1,911,794; 2,049,249; 2,133,455; 2,193,817; 2,267,136; 2,346,140; 2,388,009; 2,625,384; 2,639,217; 2,770,524; 2,780,520; 2,792,282; 2,798,790; 2,887,360; 2,962,348; 2,970,037; 3,028,215; 3,050,290; 3,113,834; 3,119,655; 3,131,996; 3,184,287; 3,212,848; 3,233,983; 3,244,476; 3,260,567; 3,264,057; 3,273,958; 3,273,959; 3,361,540; 3,395,906; 3,425,795; 3,451,767; 3,455,647; 3,459,497; 3,477,808; 3,479,133; 3,486,844; 3,498,744; 3,528,766; 3,634,999; 3,655,331; 3,656,892; 3,705,790; 3,717,698; 3,725,014; 3,796,794; 3,819,805; 3,836,628; 3,838,189; 3,845,119; 3,869,538; 3,870,780; 3,904,733; 3,933,977; 3,953,073; 3,956,457; 3,991,160; 4,019,872; 4,021,525; 4,021,526; 4,021,527; 4,022,867; 4,022,868; 4,039,617; 4,039,618; 4,044,097; 4,083,939; 4,116,757; 4,151,261; 4,160,812; 4,183,901; 4,202,667; 4,286,967; 4,288,419; 4,291,002; 4,299,799; 4,341,744; 4,344,650; 4,374,102; 4,375,454; 4,401,635; 4,472,280; 4,498,706; 4,519,806; 4,738,836; 4,781,899; 4,814,151; 4,869,882; 5,043,149; 5,192,164; 5,205,493; 5,238,664; 5,262,134; 5,283,054; 5,575,922; 5,609,838; 5,618,504; 5,624,647; 5,759,507; 5,766,270; 5,783,159; 5,911,959; 5,955,043; 5,989,505; 6,022,516; 6,207,123; 6,228,335; 6,251,346; 6,284,005; 6,322,767; 6,428,759; 6,576,206; 6,589,497; 6,609,761; 6,667,021; 7,018,594; 7,128,886; 7,255,841; 7,410,627; 7,507,388; 7,611,208; 7,638,109; 7,645,435; 8,057,765; 8,454,840; 8,603,192; 8,678,513; 8,771,622; 8,858,902; 8,899,691.

The invention claimed is:

1. A method for preparing solid sodium carbonate monohydrate ($Na_2CO_3.1H_2O$), the method comprising:
reducing the pressure of a vessel containing a solution comprising sodium carbonate and sodium chloride in an aqueous media to between 0.1 and 0.80 atmospheres with the result that the boiling point of the solution decreases below the $Na_2CO_3.1H_2O$ to anhydrous $Na_2CO_3$ transition temperature;
evaporating at least a portion of the aqueous media at the reduced pressure; and
isolating the sodium carbonate monohydrate in solid form.

2. The method according to claim 1, wherein the aqueous media is water.

3. The method according to claim 1, wherein the sodium chloride is present in an amount greater than 0 but less than 32 wt percent.

4. The method according to claim 1, wherein the sodium chloride is present in an amount between 5 wt percent and 10 wt percent.

5. The method according to claim 1, wherein the sodium chloride is present in an amount between 3 wt percent and 5 wt percent.

6. The method according to claim 1, wherein the sodium sulfate is present in an amount greater than 0 but less than 4 wt percent.

7. The method according to claim 1, wherein the solid sodium carbonate monohydrate is in a crystalline form.

8. The method according to claim 7, wherein the crystalline form is orthorhombic.

9. The method according to claim 1, wherein the vessel is a mechanical vapor recompression (MVR) crystallizer or a multiple effect evaporation crystallizer.

10. The method according to claim 1, wherein the vessel is at a temperature in the range of 50 to 110° C.

* * * * *